United States Patent

[11] 3,549,817

[72] Inventor Clifford Jack Peady
Hurstville, New South Wales, Australia

[21] Appl. No. 718,398
[22] Filed Apr. 3, 1968
[45] Patented Dec. 22, 1970
[73] Assignee Telephone Manufacturing Co. (Australasia) Proprietary Limited
Erskineville, New South Wales, Australia
a corporation of New South Wales, Australia
[32] Priority June 8, 1967
[33] Australia
[31] No. 22907/67

[54] TELEPHONE SWITCHBOARDS WITH SIGNAL-PRODUCING MEANS
4 Claims, 2 Drawing Figs.

[52] U.S. Cl. 179/42
[51] Int. Cl. H04m 5/04
[50] Field of Search 179/42, 51.5, 27CA, 94, 175.24, 56, 71, 27.02

[56] References Cited

UNITED STATES PATENTS

| | | | |
|---|---|---|---|
| 1,587,125 | 6/1926 | O. M. Leich | 179/94 |
| 3,037,087 | 5/1962 | H. H. Abbott et al. | 179/42 |
| 1,665,231 | 4/1928 | M. B. Stazak | 179/42 |
| 1,713,564 | 5/1929 | M. B. Stazak | 179/42 |

*Primary Examiner*—Kathleen H. Claffy
*Assistant Examiner*—Jan S. Black
*Attorney*—Michael S. Striker

ABSTRACT: A telephone switchboard of the kind including a third connecting circuit between each extension telephone and the switchboard, the third circuit including a gravity switch, recall button and a supervisory lamp together with a relay controlling a call-trapping facility wherein the necessity for the provision of an additional relay in the normal telephone circuit is avoided by providing an arrangement such that operation of the gravity switch produces a signal different from the signal produced by the operation of the recall button.

PATENTED DEC 22 1970

3,549,817

Inventor:
Clifford Jack Peady
By Michael S. Striker
Attorney

TELEPHONE SWITCHBOARDS WITH SIGNAL-PRODUCING MEANS

The present invention relates to improvements in telephone switchboards and more particularly to telephone switchboards including call-trapping facilities.

The invention will be described in more detail with regard to the following drawing in which.

Figure 1:
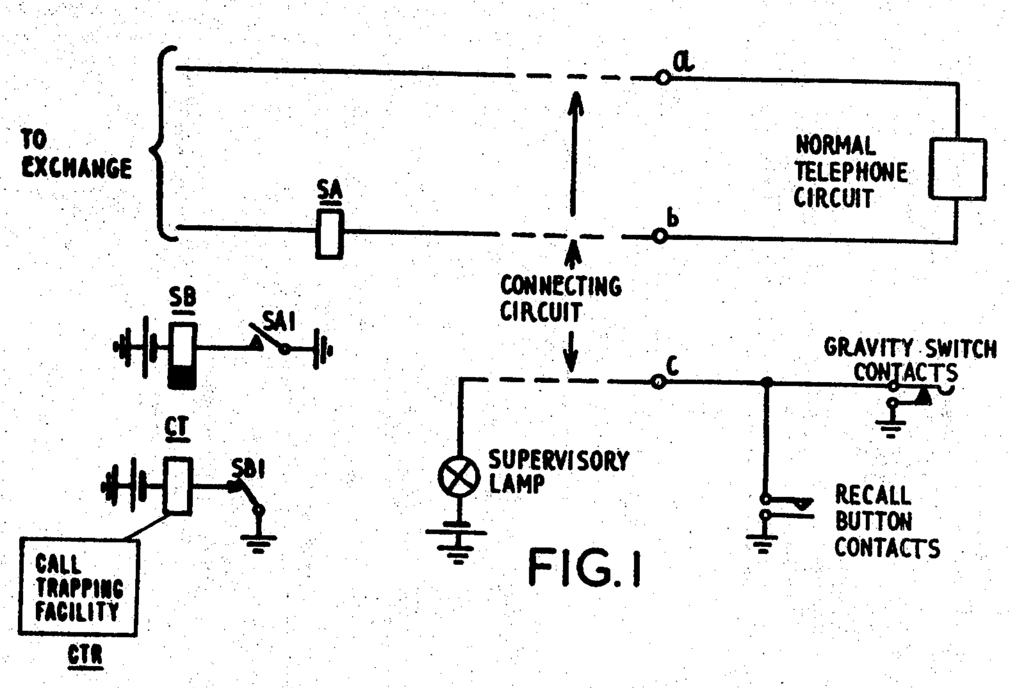
FIG. 1 is a depiction of the prior art.

There is shown in FIG. 1 a circuit arrangement which is at present used in switchboards and in this it will be seen that a third wire *c* is provided in addition to the two wires *a* and *b* normally connecting the switchboard to each extension telephone, the wire *c* being used to actuate the supervisory lamp on the switchboard. The circuit includes gravity switch contacts which close when the telephone receiver is replaced and complete the circuit of the supervisory lamp which glows to indicate the termination of a call. The same supervisory lamp may also be energized by means of the recall button contacts which are operable by means of a button on the extension telephone. This enables the caller to attract the attention of the operator when a call is in progress.

In order to actuate a call-trapping facility CTR an additional relay CT is provided which controls a circuit which is not shown as its function is not connected with the present invention. In the normal condition, that is to say, when a call is not being made, the relay CT is energized. As the clearing signal given by the gravity switch contacts is identical with the signal given by the call button contacts, this signal cannot be used for controlling relay CT and it is necessary to provide an additional relay SA in wire *b* to detect the "off-hook" condition. As SA responds to impulses from the telephone dial an auxiliary slow releasing relay SB is provided which is controlled by the relay SA and operates steadily while the extension telephone receiver is "off-hook" and is not affected by the operation of the recall button. Relay CT is released when contacts SB1 open. When the extension receiver is replaced relays SA and SB release and relay CT is reenergized to actuate a call-trapping facility.

As can be seen this arrangement is relatively complex and the necessity for including the relay SA in the wire *b* presents design problems.

The object of the present invention is to provide a more economical design by the elimination of the relay SA and its associated relay SB.

The invention consists in the provision, in a telephone switchboard including a third connecting circuit between each extension telephone and the switchboard, the third circuit including gravity switch contacts, recall button contacts, a supervisory lamp or other visible or audible warning device and a relay controlling the call-trapping facility CTR, of circuit means whereby operation of the gravity switch contacts produces a signal different from the signal produced by the operation of the recall button contacts and further circuit means whereby the supervisory lamp or other visible or audible warning device is caused to operate on receipt of a signal either from the gravity switch contacts or the recall button contacts whereas the relay is operated to render the call-trapping facility inoperative only on receipt of a signal from the gravity switch contacts.

Figure 2:
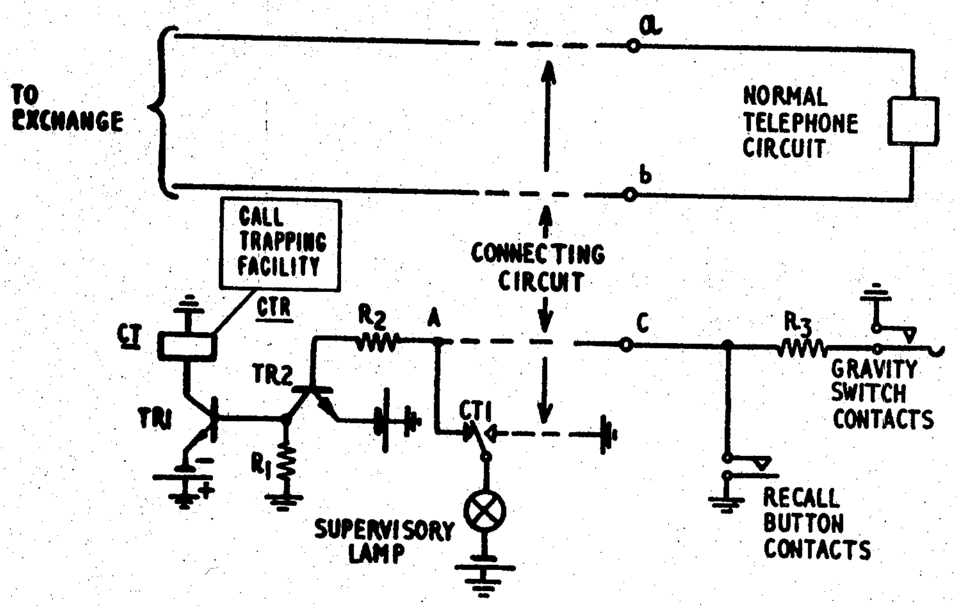
FIG. 2 shows an embodiment of the invention.

In order that the nature of the invention may be better understood a circuit embodying a preferred form thereof is shown in FIG. 2.

In the circuit of FIG. 2 it will be seen that relay SA is omitted from wire *b* altogether. Gravity switch contacts are included in wire *c* in series with a resistor R3, the gravity switch contacts being arranged to close when the receiver is lifted and in so doing connect earth via resistor R3 to wire *c*. In the normal or rest state of the circuit the relay CT is operated via the circuit including transistor $TR_1$ and resistor R1. When the receiver is lifted and earth is connected to the wire *c* via resistor R3, transistor $TR_2$ is switched on causing transistor $TR_1$ to be switched off and relay CT to release for the duration of the call. Contacts CT1 which are shown in the FIG. in the position occupied when CT is deenergized connect the supervisory lamp to the wire *c* but the presence of R3 limits the current through the lamp so that it does not glow. If, however, the recall button contacts are operated the wire *c* is connected directly to earth and the lamp glows while the button is pressed. It will be seen that in this way a distinction is made between the signal produced by the gravity switch contacts and the signal produced by the recall button contacts by virtue of the presence of the resistor R3.

When the extension telephone receiver is replaced at the end of a call, earth via resistor R3 is disconnected from wire *c* and relay CT reoperates and the supervisory lamp is energized via contacts CT1 and the connecting circuit contacts until the operator disconnects the extension from the switchboard.

The essential feature of the circuit which enables the relay SA to be dispensed which is the fact that a distinction is made between the signal arriving at A produced by the gravity switch contacts and the signal produced by the recall button contacts. Once this feature is introduced into the circuit a variety of different circuit arrangements may be used for controlling the supervisory lamp or other visible or audible warning device and the relay CT. The circuit given above is preferred in that it is relatively simple and inexpensive to construct but other circuits may be readily devised by those skilled in the art.

I claim:

1. A telephone switchboard including a third connecting circuit between each extension telephone and the switchboard, the third circuit including gravity switch contacts, recall button contacts, a supervisory lamp or other visible or audible warning device and a relay controlling a call-trapping facility, wherein there is provided circuit means whereby operation of the gravity switch contacts produces a signal different from the signal produced by the operation of the recall button contacts and further circuit means whereby the supervisory lamp or other visible or audible warning device is caused to operate on receipt of a signal either from the gravity switch contacts or the recall button contacts whereas the relay is operated to render said call trapping facility inoperative only on receipt of a signal from the gravity switch contacts.

2. A telephone switchboard as claimed in claim 1 wherein closing of the gravity switch contacts is effected by the receiver of an extension and connects the third connecting circuit to earth via a resistor wherein closing of the recall button contacts connects the third connecting circuit directly to earth.

3. A telephone switchboard as claimed in claim 2 wherein the said relay operates contacts whereby the supervisory lamp or other warning device is connected to the third connecting circuit when the relay is deenergized and to earth when it is energized 4. A telephone switchboard as claimed in claim 3 wherein the said relay is controlled by a transistor which is arranged to be switched on or off when the gravity switch contacts are open or closed respectively.